May 24, 1966 N. SHERWOOD 3,252,598
APPARATUS FOR UNLOADING STORED MATERIAL
Filed May 15, 1964 3 Sheets-Sheet 3

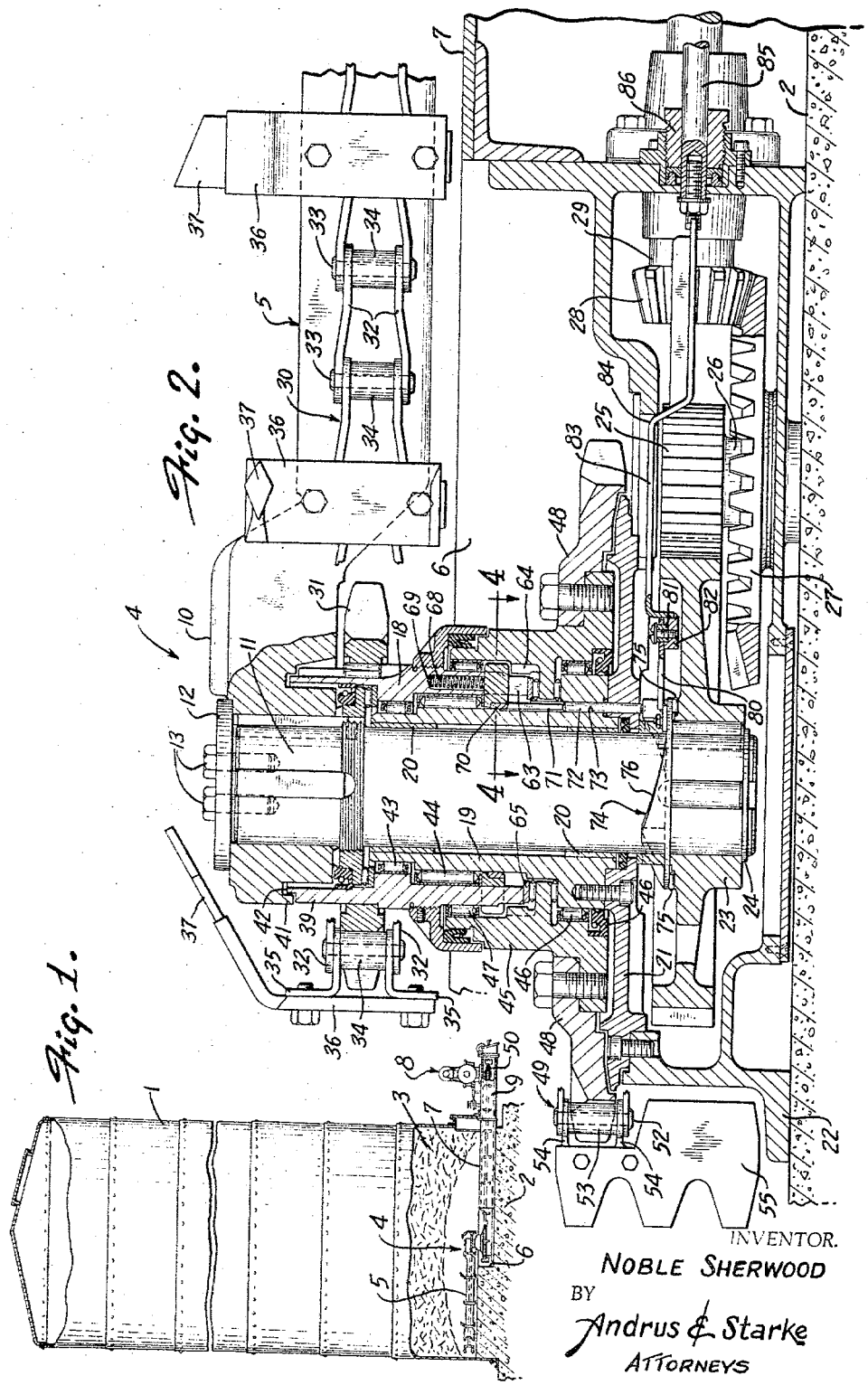

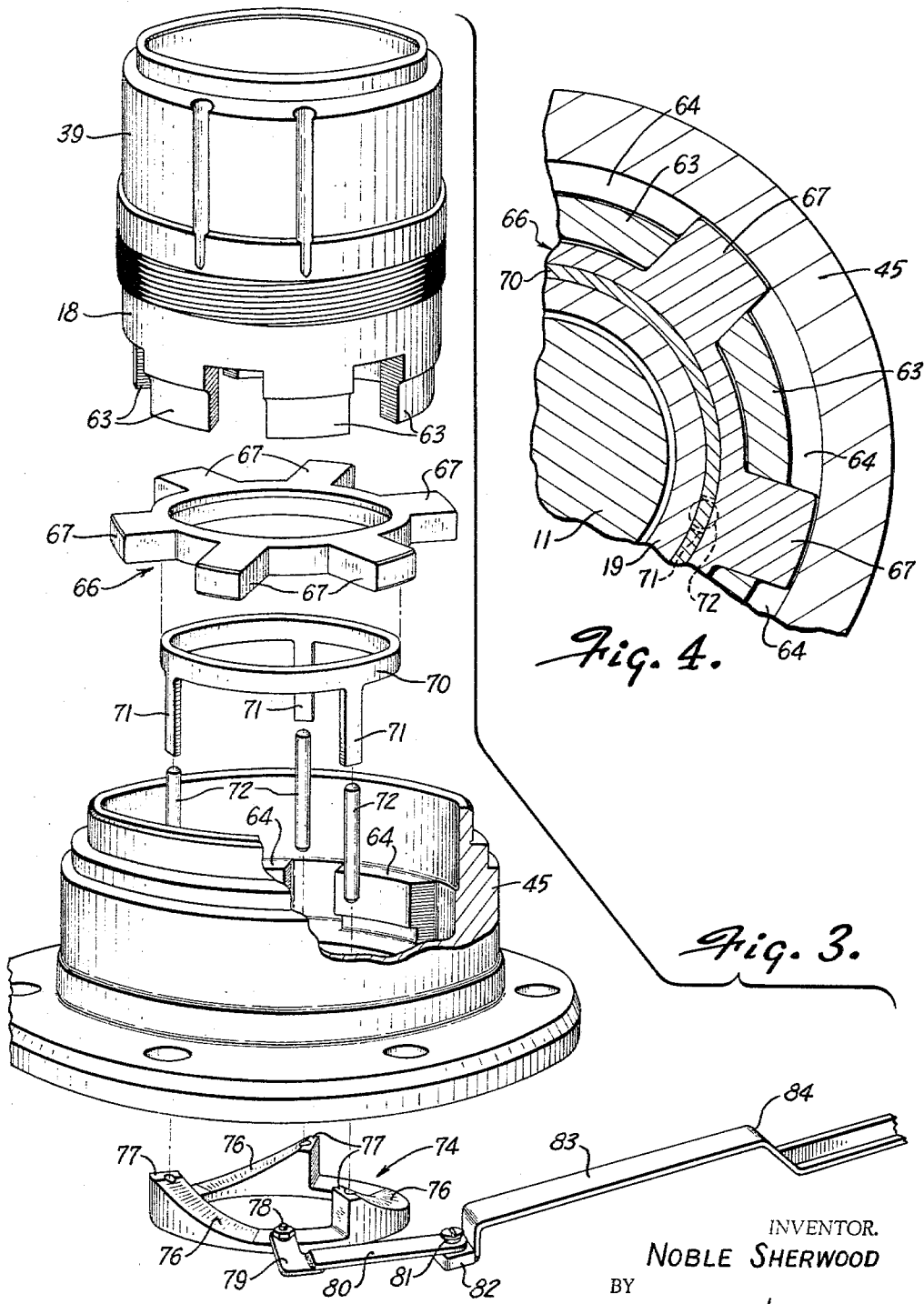

INVENTOR.
NOBLE SHERWOOD
BY
Andrus & Starke
ATTORNEYS

UNITED STATES PATENT OFFICE 3,252,598
Patented May 24, 1966

3,252,598
APPARATUS FOR UNLOADING STORED MATERIAL
Noble Sherwood, Greenwich, Conn., assignor to A. O. Smith Harvestore Products, Inc., Arlington Heights, Ill., a corporation of Delaware
Filed May 15, 1964, Ser. No. 367,796
18 Claims. (Cl. 214—17)

This invention relates to an apparatus for unloading a stored material from a storage structure such as a silo.

Storage structures, such as a silo, can be unloaded by a bottom unloading mechanism which is located on the floor of the silo and undercuts the stored material and conveys it to the exterior. An unloading device of this type generally includes a cutter arm which is journalled for rotation at the center of the silo and slowly rotates within the silo beneath the stored material. The cutter arm carries a cutting mechanism such as an endless cutter chain which dislodges the silage or other stored material and moves it towards the center of the silo where it is delivered to the central portion of a radially extending trough formed in the floor or foundation of the silo. A conveyor unit operates within the trough and conveys the loosened or dislodged material to the exterior of the silo.

In the conventional bottom unloader, the cutting mechanism and the conveyor unit both include an endless chain, each of which travels over a central sprocket journalled around a central vertical post in the silo. The conveyor unit chain is driven in an endless path by a drive sprocket located on the exterior of the silo, and rotation of the central driven sprocket of the conveyor unit is transmitted to the central sprocket of the cutter arm chain to drive the cutter arm chain as the cutter arm slowly rotates within the silo.

As the chains move around the central sprockets, the side edges of the chain links tend to drive or extrude the silage or other stored material inwardly and force the silage into the clearance between the rotating sprocket and non-rotating supporting members. The silage is continually driven within the clearance and in many cases is forced through the seals into the bearings which are quickly corroded by the silage juices.

The present invention prevents the silage or other stored material from being driven inwardly to the bearings by designing the sprocket such that the clearance between the sprocket and the stationary support member is located out of horizontal alignment with the side edges of the chain links. In addition, it is preferred that the clearance between the members initially extend vertically and then horizontally in a series of steps which will tend to prevent the silage from being driven directly into the clearance by the chain links.

This construction prevents the silage from being extruded or forced through the seals and into contact with the bearings and thereby substantially increases the length of service of the bearings and reduces maintenance costs.

In some situations when the storage structure contains free flowing material, such as shelled corn, flour, wood meal or the like, it is not necessary to dislodge the material, for the material will flow by gravity downwardly into the conveyor. The present invention is directed to a clutch mechanism which enables the cutter arm chain to be selectively disengaged while the conveyor chain is operating. More specifically, the cutter arm chain is carried by a sprocket which is mounted on an upper sprocket hub journalled on the central post, while the conveyor chain is carried by a sprocket mounted on a lower sprocket hub and which is also journalled on the central post. A clutch ring mechanism is employed to selectively connect and disconnect the sprocket hubs. When the hubs are in the engaged position, rotation of the lower sprocket hub will be transmitted to the upper hub to thereby drive the cutter arm chain. When the hubs are disengaged, the conveyor chain will operate, but the cutter arm chain will not operate. The clutch mechanism is operated by a lever arm which extends from the center of the silo outwardly within the trough to the exterior. With this structure, the cutter arm chain can be selectively disengaged when desired so that only the conveyor unit will operate.

Other objects and advantages will appear in the course of the following description.

The drawings illustrate the best mode presently contemplated of carrying out the invention.

In the drawings:

FIG. 1 is an elevational view of a silo, with parts broken away, and incorporating the unloading mechanism of the invention;

FIG. 2 is an enlarged fragmentary vertical section showing the connection of the cutter arm chain and the conveyor chain to the central post and the clutch mechanism;

FIG. 3 is an exploded perspective view showing the clutch mechanism;

FIG. 4 is an enlarged fragmentary section taken along line 4—4 of FIG. 2; and

Figure 5:
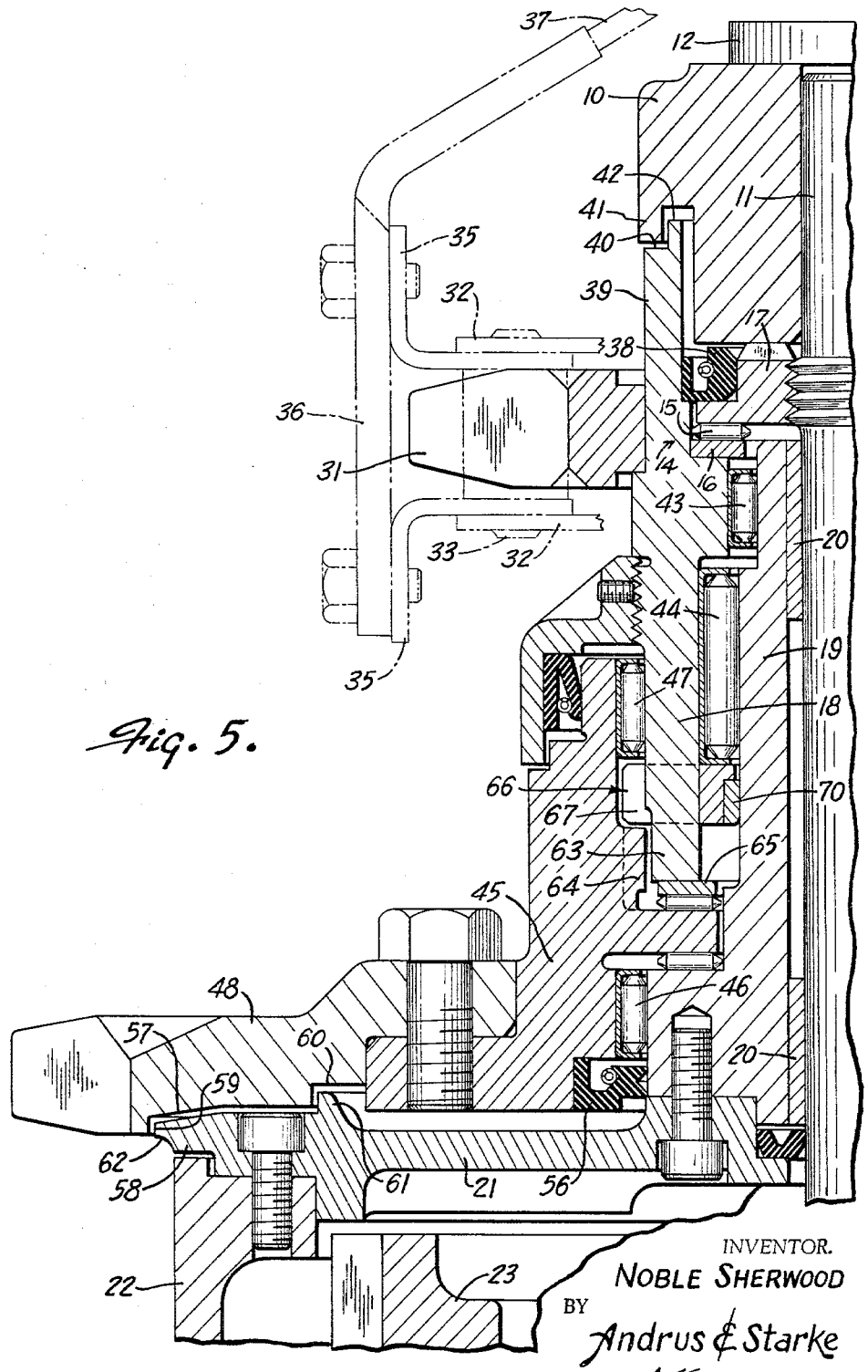
FIG. 5 is an enlarged fragmentary vertical section showing the conveyor chain sprocket and the supporting base.

The drawings illustrate a storage structure or silo 1 which is supported on the foundation 2 and is adapted to contain a stored material 3, such as corn silage, grass silage, shelled corn, chopped ear corn, soy meal, sugar, flour or the like. The material 3 is introduced into the silo 1 through a suitable inlet at the top of the structure and is removed by means of a mechanical unloader 4 located at the bottom of the silo.

The unloader 4 includes a cutter arm 5 which is rotatably mounted at the center of the silo and rotates within the silo to cut and dislodge the stored material 3 and deliver the material to the center of the silo.

A radially extending trough 6 is formed in the foundation 2 and the stored material is delivered to the central portion of the trough where a conveyor unit 7 conveys the material to the exterior of the silo.

The rotating cutter arm 5 and conveyor unit 7 are driven by a drive unit 8 which is secured to a conveyor housing 9 on the outside of the silo 1.

The cutter arm 5 includes a central hub 10 which is secured to the upper end of a vertical post or shaft 11 mounted at the center of the silo. The hub 10 is secured to the shaft 11 by a cover 12 and bolts 13 which extend through the cover and are threaded within openings in the upper end of the shaft 11. The cutter arm hub 10 is carried by a thrust bearing assembly 14 which includes a series of bearings 15, a lower race 16 and an upper retaining nut 17 threaded on shaft 11. The thrust bearing assembly 14 is mounted within a recess formed in an upper sprocket hub 18 which surrounds the shaft 11.

The shaft 11 is journalled for rotation within a stationary sleeve 19 by a pair of bushings 20. The lower end of the sleeve 19 is secured by bolts to base ring 21 and the ring 21 is bolted to a base casting 22 which rests on the foundation 2 within the trough 6.

To rotate the vertical shaft 11 and drive the cutter arm within the silo, a gear 23 is keyed to the lower end of the shaft and is retained on the shaft by a snap ring 24. The gear 23 engages a pinion 25 secured to a shaft 26, and the shaft 26 also carries a beveled gear 27 which engages gear 28. The gear 28 is secured to a horizontal shaft 29 which is driven by the drive unit 8 in a manner as described in the Patent 2,635,770 of Tiedemann. Rotation of the shaft 29 acts through the gears 28, 27 and 23 to rotate the central shaft 11 at a slow rate of speed, generally in the range of 1 to 2 r.p.m. to thereby rotate the cutter arm 5 around the silo.

The silage is dislodged and moved toward the center of the silo by a cutter chain 30 which is supported on the cutter arm 5. The chain 30 is trained over a sprocket 31 secured to the upper sprocket hub 18 and over a second sprocket, not shown, journalled on the outer end of the cutter arm 5. The chain 30 is a conventional roller link chain which includes a series of links 32, which are joined together by vertical pins 33. The upper and lower pairs of links 32 are spaced apart by spacers 34 which are positioned around the pins 33 and a number of the links 32 carry angles 35 which support bars 36. The bars 36 carry a number of cutter teeth, indicated generally by 37. The teeth 37 engage and dislodge the silage as the chain 30 moves in its endless path on the cutter arm 5 and move the loosened silage to the center of the silo.

To prevent the stored material 3, such as silage, from contacting the thrust bearing assembly 14, an annular seal 38 is positioned in a recess in the upper race 15 of the thrust bearing assembly 14. The sprocket hub 18 is provided with an upwardly extending flange or extension 39 and the outer surface of the extension 39 is formed with a step 40. The cutter arm hub 10 is provided with a complementary downwardly extending flange 41 which is received in the step or recess 40 of the hub extension 39. The flange 41 and the recess 40 are spaced apart to provide a space or clearance 42 between the members, and this clearance extends horizontally and then vertically. As the cutter chain 30 moves around the sprocket 31 at the central shaft 11, the silage tends to be driven radially inward by the side edges of the links 32. By positioning the space 42 a substantial distance upwardly from the side edges of the upper links 32, the silage extruded or driven inwardly by these edges will not be driven into the space or clearance between the cutter arm hub 10 and the sprocket hub 18 so that silage will not pass through the seal 38 to the thrust bearing 14.

The upper sprocket hub 18 is journalled on the sleeve 19 by a pair of bearing assemblies 43 and 44, and a lower sprocket hub 45 is located beneath the upper sprocket hub 18 and is journalled on the sleeve by a bearing assembly 46 and is also journalled on the upper sprocket hub 18 by a bearing assembly 47. The lower sprocket hub 45 supports a sprocket 48 which carries a conventional endless roller link chain 49. Chain 49 is driven in an endless path by a sprocket 50 located within the conveyor housing 9 outside of the silo 1. The sprocket 50 is driven by drive mechanism similar to that shown in the Tiedemann Patent 2,635,770, and rotation of the drive sprocket 50 serves to drive the conveyor chain 49 and sprocket 48. In addition, rotation of the sprocket 48 is transmitted to the cutter chain sprocket 31 to drive the cutter chain 30.

The conveyor chain 49 includes a series of links 51 which are connected by vertical pins 52 and the upper and lower pairs of links are spaced apart by spacers 53. A number of the links 51 are provided with projections 54 which extend laterally from the chain, and a series of conveyor paddles 55 are secured to the projections 54 and move within the trough 6 to convey the silage to the exterior of the silo.

As the sprocket 48 and hub 45 rotate during operation of the unloader, and as sleeve 19 and ring 21 are stationary, an annular seal 56 is located between the hub 45 and the sleeve 19 to prevent silage and other foreign matter from contacting the lower bearing 46.

As the conveyor chain 49 moves around the lower sprocket 48, the side edges of the lower pairs of chain links 51 drive or extrude silage radially inwardly in a horizontal plane. To reduce the tendency for the silage to be driven inwardly within the clearance between the sprocket 48 and the ring 21, the lower surface of the sprocket 48 is provided with a recess 57 which receives a shoulder 58 formed on the ring 21. The space 59 between the recess 57 and the shoulder 58 extends vertically and is located outwardly of the corner of the ring 21 so that the silage being driven inwardly by the side edges of the chain links 51 will not be forced or driven into the vertical space 59.

To further insure that the silage will not move inwardly toward the seal 56, the sprocket 49 is provided with a second recess 60 which receives a shoulder or step 61 formed in the ring 21. Again, the spacing between the recess 60 and shoulder 61 extends vertically, and this again prevents silage from moving horizontally in toward the seal 56 and bearing 46. In addition, the inner corner 62 of the ring, is rounded and this serves to deflect the silage downwardly away from the vertical space 59.

With the conventional bottom unloader, such as that shown in the Tiedemann Patent 2,635,770, the cutter chain 30 and the conveyor chain 49 are both driven from the outer drive sprocket 50 so that they operate in unison. Under certain conditions, particularly when the silo is used to store free-flowing material, such as shelled corn, flour and the like, it is not necessary to rotate the cutter arm 5, nor to operate the cutter chain 30, for the material will flow downwardly by gravity into the trough 6 and be discharged by operation of the conveyor unit 7. Under these circumstances, it is desirable to have a separate drive for the cutter arm chain 30 so that the cutter chain can be disengaged while the conveyor chain 48 is operating.

According to the invention, a clutch mechanism is employed which is used to selectively engage the upper sprocket hub 18 to the lower sprocket hub 45. As best shown in FIGS. 3 and 4, the upper sprocket hub 18 is provided with a plurality of spaced, downwardly extending segments or teeth 63, and the lower sprocket hub 45 is also provided with a like number of segments or teeth 64 which are located in the same horizontal plane as teeth 63 but are positioned radially outward of the segments 63. The lower end of the segments 63 bear against a thrust bearing assembly 65 which is supported on a shoulder of the lower hub 45.

To lock the segments 63 and 64 and thereby transmit rotation of the lower hub 45 to the upper hub 18, a clutch ring 66 is employed. As best shown in FIG. 3, the clutch ring encircles the sleeve 19 and is provided with a series of radially extending ears 67 which are adapted to be received between the segments 63 and 64 and thereby lock the segments together.

The clutch ring 66 is vertically movable with respect to the hubs 18 and 45, and as shown in FIG. 2, the clutch ring is in the upper or disengaged position in which the ears 67 of clutch ring 66 are located in the upper end of the slots between teeth 63 in a horizontal plane above the plane of the teeth 64 of hub 45. The clutch ring is normally urged to the lower or locked position by a series of coil springs 68 which are located within recesses 69 formed in the upper hub 18. The springs 68 bear against the upper surface of the ears 67 on the clutch ring 66 and urge the clutch ring 66 downwardly so that the ears are positioned in the same horizontal plane as teeth 64 and project radially outward through the slots between teeth 63 and into the slots between teeth 64 to lock the teeth 63 and 64 together.

To disengage the clutch ring 66, an actuating ring 70 is located within a recess in the inner surface of the clutch ring 66 and the ring 70 is provided with a series of downwardly extending spaced fingers 71. Each of the fingers 71 rests on the upper end of a lift pin 72 which is slidable within an opening 73 in sleeve 19.

To lift the pins 72 and thus lift the clutch ring 66, a cam ring 74 encircles the shaft 11 and a series of rollers 75 are located between the cam ring and the hub of gear 23 and permit the cam ring 74 to rotate with respect to the gear.

As best shown in FIG. 3, the upper surface of cam ring 74 is provided with a series of spaced, inclined cam surfaces 76. Three cam surfaces 76 are shown, and each cam surface is provided with a low end which is substantially flush with the upper surface of ring 74 and a high end 77 which is located a substantial distance above the ring 74. The high end of each cam 77 is spaced approximately 45° from the adjacent lower end of the next succeeding cam surface.

The cam ring 74 is rotated about the axis of shaft 11 and as the ring rotates, the lift pins 72 ride up the inclined surfaces 76 and thus serve to lift the clutch ring 66 to the disengaged position. To rotate the cam ring, a pin 78 is secured to the ring 74 and a link 79 is pivotally connected to the pin 78. A second link 80 interconnects the link 79 with a pin 81 which is journalled in a boss 82. A lever or arm 83 is secured to the boss and extends outwardly beneath the ring 21 and within the base casting 22. The central portion of the arm 83 is provided with a bend 84 and the outer end of arm 83 is connected to a rod 85 which is journalled within a sleeve bearing 86 secured within the wall of the base casting. The rod 85 extends outwardly within the trough 6 to the exterior of the silo where it can be actuated by the operator. Pulling outwardly on the rod 85 acts through the links 79 and 80 to rotate the cam ring 74 about the axis of shaft 11. As the cam ring is rotated, the lift pins 72 ride upwardly on the cam surfaces 76 until they reach the high point 77. At this position, the pins 72 have lifted the actuating ring 70 and the clutch ring 66 to a position where the clutch ring is out of engagement with the segments 63 and 64. With the clutch ring out of engagement, the lower sprocket hub 45 will rotate, but this rotation will not be transmitted to the upper hub 18. With the upper hub 18 disengaged, the lower hub 45 will be journalled about hub 18 by the upper bearing 47.

When it is desired to have the cutter arm chain 30 operate in conjunction with the conveyor chain, the rod 85 is pushed inwardly thereby rotating the cam ring to its original position. In this case, the lift pins 72 will ride downwardly on the cam surfaces 76 with the result that the clutch ring 66 will be urged downwardly by springs 68 to the engaged position where the ears 67 will interlock the teeth 63 and 64. In the engaged position, rotation of the lower hub 45 will be transmitted to the upper hub 18 so that the upper sprocket hub 18 and cutter chain 30 will also rotate.

The present invention permits the cutter arm chain to be selectively disengaged so that it will not travel while the conveyor chain is still operating. Disengagement of the cutter arm chain is particularly desirable when the storage structure contains a free flowing material which will flow by gravity downwardly into the trough 6. In this situation, it is not necessary to rotate the cutter arm nor to move the cutter arm chain 30, and the cutter arm is normally rotated only after the material has been substantially removed from the silo. Rotation of the cutter arm and movement of the cutter arm chain is then employed to collect the material which still remains on the silo floor and deposit the material in the trough.

The clutching mechanism can also be used in certain circumstances when the storage structure contains a non-free-flowing material, such as silage. In this situation it may be desired to operate the conveyor without the cutter arm in order to clean out the conveyor trough or to remove an accumulation of silage without having the additional load of the cutter arm on the motor.

Various modes of carrying out the invention are contemplated as being within the scope of the following claims particularly pointing out and distinctly claiming the subject matter which is regarded as the invention.

I claim:

1. In an apparatus for unloading a stored material from a storage structure, a vertical shaft disposed centrally of the silo, a cutter arm secured to the shaft and rotatable within the structure, cutting means on the cutter arm for dislodging the material and moving it toward the center of the structure, conveying means for conveying dislodged material from the center of the silo to the exterior, drive means for rotating the shaft to thereby rotate the cutter arm, second drive means separate from said first named drive means operably connected to said conveying means for operating said conveying means, and clutch means for selectively engaging the cutting means with the conveying means to transmit movement of said conveying means to said cutting means.

2. In an apparatus for unloading a stored material from a storage structure, a vertical shaft disposed centrally of the silo, a cutter arm secured to the shaft and rotatable within the structure, cutting means on the cutter arm for dislodging the material and moving it toward the center of the structure, a first axially fixed drive member operably connected to the cutting means, conveying means for conveying dislodged material from the center of the silo to the exterior, a second axially fixed drive member operably connected to the conveying means, drive means for rotating the shaft to thereby rotate the cutter arm, second drive means operably connected to one of said drive members for operating said drive member, clutch means disposed concentrically of the shaft and movable vertically between an engaged position and a disengaged position for selectively locking the drive members together when in the engaged position, and operating means operably connected to the clutch means and extending outwardly to the exterior of the storage structure for moving the clutch means from one of said positions to the other of said positions.

3. In a silo unloader, a fixed base member, a vertical shaft disposed centrally of the silo and mounted for rotation with respect to said base member, a cutter arm secured to the shaft and disposed to rotate within the silo, first drive means for rotating the shaft to thereby rotate the cutter arm within the silo, first sprocket means journalled on the base member, a cutter chain carried by said sprocket means for dislodging silage and moving it toward the center of the silo, second sprocket means journalled on said base member, a conveyor chain carried by said second sprocket means and serving to convey dislodged silage from the center of the silo to the exterior, second drive means operably connected to one of said sprocket means, each of the sprocket means having an axially extending projection with the projection of one of said sprocket means being disposed radially outward of the projection on the other sprocket means, a clutch ring disposed around the shaft and mounted for vertical movement from an engaged position to a disengaged position, said clutch ring when in the engaged position being disposed in horizontal alignment with the projections on said first and second sprocket means to thereby lock the projections together, biasing means for urging the clutch ring to one of said positions, and means operably engaged with said clutch ring and extending to the exterior of the silo for moving the clutch ring to the other of said positions.

4. In a silo unloader, a vertical sleeve disposed centrally of the silo, a shaft journalled within the sleeve, a cutter arm secured to the upper end of the shaft and disposed to rotate within the silo, first drive means for rotating the shaft to thereby rotate the cutter arm within the silo, a first hub journalled on said sleeve, a first sprocket mounted on said first hub, a cutter chain carried by said first sprocket and disposed to dislodge silage as the cutter arm rotates within the silo and move the silage toward the center of the silo, a second hub journalled on said sleeve, a second sprocket mounted on said second hub, a conveyor chain carried by said second sprocket and adapted to convey dislodged silage from the center of the silo to the exterior, second drive means operably connected to the second hub, and clutch means disposed concentrically of the shaft and movable axially of the shaft for selectively interconnecting said hubs together to thereby transmit rotation from said second hub to the first hub.

5. The structure of claim 4, in which each hub is provided with a series of axially extending circumferentially spaced projections with the projections on one of said hubs located radially outward of the projections on the other of said hubs, and said clutch means includes a movable clutch member for selectively locking the projections of one hub to the projections of the second hub.

6. In a silo unloader, a first drive member journalled about a vertical axis and having a series of axially extending circumferentially spaced projections, a second drive member journalled about said vertical axis and having a series of axially extending circumferentially spaced projections, the projections on said second drive member being disposed in the same horizontal plane as the projections on said first drive member and disposed radially outward of the projections on said first drive member, a clutch member having a series of ears extending radially between the projections of said first and second drive members to lock the drive members together, and means for moving the clutch member axially out of said horizontal plane to thereby disengage said first and second drive members.

7. In a silo unloader, a fixed base member, a vertical shaft disposed centrally of the silo and mounted for rotation with respect to said base member, a cutter arm secured to the shaft and disposed to rotate within the silo, first drive means for rotating the shaft to thereby rotate the cutter arm within the silo, first sprocket means journalled on the base member, a cutter chain carried by said sprocket means for dislodging silage and moving it toward the center of the silo, second sprocket means journalled on said base member, a conveyor chain carried by said second sprocket means and serving to convey dislodged silage from the center of the silo to the exterior, second drive means operably connected to one of said sprocket means, each of the sprocket means having an axially extending projection with the projection of one of said sprocket means being disposed radially outward of the projection on the other sprocket means, a clutch ring disposed around the shaft and mounted for vertical movement from an engaged position to a disengaged position, said clutch ring when in an engaged position being disposed in horizontal alignment with the projections on said first and second sprocket means to thereby lock the projections together, biasing means for urging the clutch ring to one of said positions, lifting means mounted for axial movement and engageable with said clutch ring for raising the clutch ring to the other of said positions, and operating means operably connected with said lifting means and extending to the exterior of the silo for actuating said lift means to thereby raise the clutch ring to the other of said positions.

8. In an apparatus for removing a stored material from a storage structure, a first axially fixed drive member journalled around a central vertical axis in the storage structure and having a series of axially extending circumferentially spaced projections, a second axially fixed drive member journalled around said vertical axis and having a series of axially extending circumferentially spaced projections, the projections on said second drive member being disposed in the same horizontal plane as the projections on said first drive member and being located on a different radius than the projections on said first drive member, a clutch member having a series of circumferentially spaced ears, said clutch member being axially movable from an engaged position in which the ears extend radially between the projections of said first and second drive members to lock the drive members together to a disengaged position, and operating means connected to said clutch member and extending outwardly to the exterior of the storage structure for moving the clutch member between said positions.

9. In an apparatus for removing a stored material from a storage structure, a vertical shaft disposed in said storage structure, material-loosening means for loosening the stored material and working the loosened material in to an accumulation zone and including a first drive member journalled around the axis of said shaft, material conveying means for conveying the loosened material from the accumulation zone to the exterior of the storage structure and including a second drive member journalled about the axis of said shaft, drive means operably connected to one of said drive members, clutch means disposed concentrically of the shaft movable axially from an engaged position to a disengaged position for selectively interconnecting said drive members when in the engaged position, and operating means connected to said clutch means and extending outwardly to the exterior of the storage structure for actuating said clutch means.

10. In an apparatus for removing a stored material from a storage structure, a vertical shaft disposed in said storage structure, material-loosening means for loosening the stored material and working the loosened material in to an accumulation zone and including a first drive member journalled around the axis of said shaft, material conveying means for conveying the loosened material from the accumulation zone to the exterior of the storage structure and including a second drive member journalled about the axis of said shaft, drive means operably connected to one of said drive members, clutch means movable in an axial direction from an engaged position to a disengaged position for selectively interconnecting said drive members when in the engaged position, actuating means mounted for movement generally parallel to the axis of said shaft and engageable with said clutch means for moving said clutch means to one of said positions, and operating means operably connected to the actuating means and extending to the exterior of the storage structure for operating said actuating means and moving said clutch means.

11. In an apparatus for removing a storde material from a storage structure, a vertical shaft disposed in said storage structure, material-loosening means for loosening the stored material and working the loosened material in to an accumulation zone and including a first drive member journalled around the axis of said shaft, material conveying means for conveying the loosened material from the accumulation zone to the exterior of the storage structure and including a second drive member journalled about the axis of said shaft, drive means operably connected to one of said drive members, clutch means movable from an engaged position to a disengaged position for selectively interconnecting said drive members when in the engaged position, actuating means mounted for vertical movement and engageable with said clutch means for moving said clutch means to one of said positions, an operating member located on the exterior of the storage structure and extending inwardly toward said shaft, said operating member disposed for movement in a horizontal plane, and means interconnecting said operating member and said actuating means for converting horizontal movement of said operating member to vertical movement of said actuating means to thereby move the clutch means.

12. In an apparatus for removing a stored material from a storage structure, a vertical shaft disposed in said storage structure, material-loosening means for loosening the stored material and working the loosened material in to an accumulation zone and including a first drive member journalled around the axis of said shaft, material conveying means for conveying the loosened material from the accumulation zone to the exterior of the storage structure and including a second drive member journalled about the axis of said shaft, drive means operably connected to one of said drive members, clutch means movable from an engaged position to a disengaged position for selectively interconnecting said drive members when in the engaged position, a series of clutch actuating members mounted for vertical movement with the upper ends of said members being operably connected to said clutch means, cam means operably connected to the lower ends of said members, and operating means connected to the cam means and extending to the exterior of the structure for operating said cam means to thereby actuate said members and move said clutch means.

13. The structure of claim 10, and including biasing means for urging the clutch means to the other of said positions.

14. An apparatus for storing material, comprising a foundation, a storage structure supported on the foundation, said foundation having a trough extending from the exterior of the storage structure to the center thereof, a vertical shaft extending upwardly from the foundation and located at the center of the storage structure, cutter arm connected to the shaft and disposed to rotate within the structure over the foundation, first drive means for rotating the shaft and the cutter arm, material loosening means supported by the cutter arm for loosening the stored material and working it in to the center of the structure and including a first drive member journalled about the axis of said shaft, material conveying means disposed in the trough for conveying loosened material to the exterior of the structure and including a second drive member journalled about the axis of said shaft, second drive means connected to the second drive member for driving said second drive member, clutch means disposed concentrically of the shaft movable vertically from an engaged position to a disengaged position for selectively interconnecting said drive members when in the engaged position, and operating means operably connected to the clutch means and extending within the trough to the exterior of the structure for moving said clutch means from one of said positions to the other.

15. The structure of claim 14, in which the conveying means comprises an endless chain moving in radially extending parallel paths of travel and the second drive member comprises a sprocket, and the operating means extends in a vertical plane located centrally of the trough between said paths of travel.

16. In a silo unloader, a fixed base member, a vertical shaft disposed centrally of the silo and mounted for rotation with respect to said base member, a cutter arm secured to the shaft and disposed to rotate within the silo, first drive means for rotating the shaft to thereby rotate the cutter arm within the silo, first sprocket means journalled on the base member, a cutter chain carried by said sprocket means for dislodging silage and moving it toward the center of the silo, second sprocket means journalled on said base member, a conveyor chain carried by said second sprocket means and serving to convey dislodged silage from the center of the silo to the exterior, second drive means operably connected to one of said sprocket means, each of the sprocket means having an axially extending projection with the projection of one of said sprocket means being disposed radially outward of the projection on the other sprocket means, a clutch ring disposed around the shaft and mounted for vertical movement from an engaged position to a disengaged position, said clutch ring when in an engaged position being disposed in horizontal alignment with the projections on said first and second sprocket means to thereby lock the projections together, resilient means for urging the ears to the engaged position, a series of lifting members disposed in engagement with the clutch ring, a cam ring mounted for rotation about said vertical shaft and having an inclined cam surface, said lifting members disposed to ride on said cam surface as said cam ring is rotated, and operating means extending to the exterior of the silo for rotating the cam ring to thereby lift the lifting members and move the clutch ring to the disengaged position.

17. In a silo unloader, a vertical sleeve disposed centrally of the silo, a shaft journalled within the sleeve, a cutter arm secured to the upper end of the shaft and disposed to rotate within the silo, first drive means for rotating the shaft to thereby rotate the cutter arm within the silo, a first hub journalled on said sleeve, a first sprocket mounted on said first hub, a cutter chain carried by said first sprocket and disposed to dislodge silage as the cutter arm rotates within the silo and move the silage toward the center of the silo, a second hub journalled on said sleeve, a second sprocket mounted on said second hub, a conveyor chain carried by said second sprocket and adapted to convey dislodged silage from the center of the silo to the exterior, second drive means operably connected to the second hub, clutch means interconnecting said first and second hubs for selectively locking said hubs together to thereby transmit rotation from said hub to the first hub, a cam member journalled for rotation about the sleeve and having an inclined cam surface, a cam following member disposed to ride on the cam surface and operably engaged with said clutch means, an operating member mounted for reciprocating movement and having a portion located on the exterior of the silo and extending inwardly of the silo, and means interconnecting the operating member and the cam ring for converting reciprocating motion of said operating member to rotation movement of the cam ring.

18. The structure of claim 6 in which the projections of the first drive member having a substantially greater depth than the projections of the second drive member.

References Cited by the Examiner

UNITED STATES PATENTS

| 2,635,770 | 4/1953 | Tiedemann | 214—17 |
| 3,084,814 | 4/1963 | Schaefer | 124—17 |

GERALD M. FORLENZA, *Primary Examiner.*

R. G. SHERIDAN, *Assistant Examiner.*